United States Patent [19]

Nishiura

[11] Patent Number: 4,820,024

[45] Date of Patent: Apr. 11, 1989

[54] ACTIVE MATRIX DISPLAY

[75] Inventor: Masaharu Nishiura, Yokosuka, Japan

[73] Assignee: Fuji Electric Co., Ltd., Kawasaki, Japan

[21] Appl. No.: 929,389

[22] Filed: Nov. 10, 1986

[30] Foreign Application Priority Data

Nov. 8, 1985 [JP] Japan .................................. 60-250149

[51] Int. Cl.4 ............................................... G02F 1/13
[52] U.S. Cl. ..................................... 350/333; 350/334; 350/339 R; 350/336
[58] Field of Search ................... 350/333, 339 R, 332, 350/334, 331 R, 336

[56] References Cited

U.S. PATENT DOCUMENTS 3,864,023  2/1975  Glaser et al. .......................... 350/336
4,651,185  3/1987  Holmberg et al. ..................... 350/334

OTHER PUBLICATIONS

Togashi et al, "An LC-TV Display Controlled by a-Si Diode Rings", proceeding of the SID, vol. 26, Jan. 1985.

Primary Examiner—Stanley D. Miller
Assistant Examiner—Trong Quang Phan
Attorney, Agent, or Firm—Brumbaugh, Graves, Donohue & Raymond

[57] ABSTRACT

A liquid crystal matrix display which uses a parallel pair of oppositely-poled diodes in series with the crystal element between the scanning and data electrodes. A circuit arrangement for combining the scanning electrodes, the pixel electrodes and the diodes on a common glass substrate uses insulating layers, opaque metallic layers, and transparent conductive layers in a manner to improve the aperture ratio of the display and to reduce the number of layers needed.

3 Claims, 2 Drawing Sheets

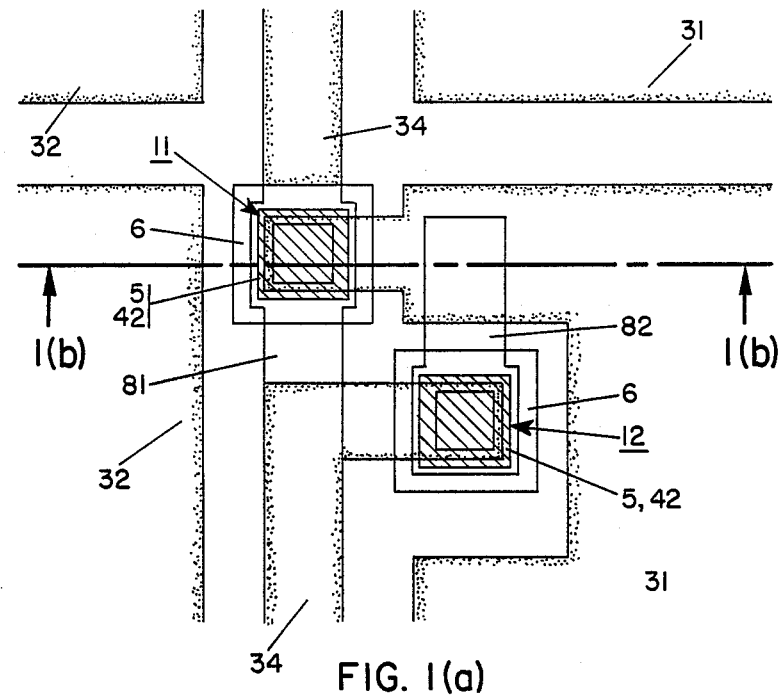
FIG. 1(a)
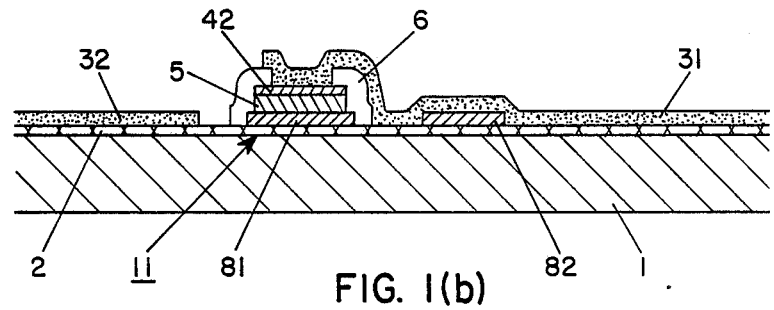
FIG. 1(b)
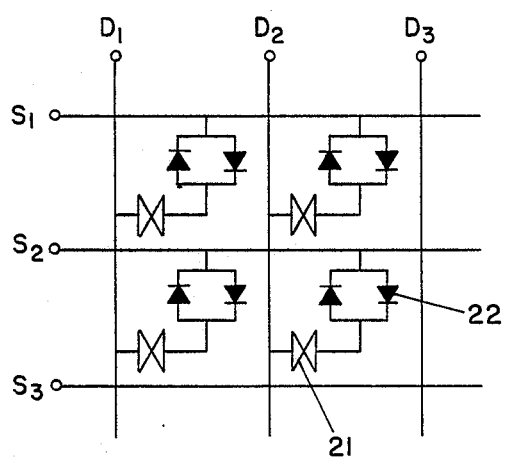
FIG. 2 PRIOR ART
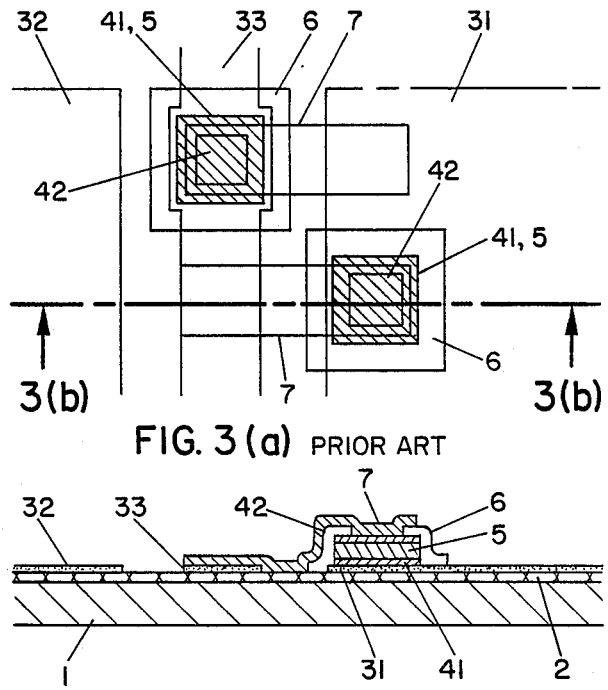
FIG. 3(a) PRIOR ART
FIG. 3(b) PRIOR ART

ACTIVE MATRIX DISPLAY

FIELD OF THE INVENTION

The present invention relates to an active matrix display which employs an active element, such as a liquid crystal element, electrophoresis element or electrochromic element, between a pair of substrates which include pixel electrodes for activating the element and scanning and data electrodes for selecting the pixels to be activated.

DESCRIPTION OF THE PRIOR ART

FIG. 2 shows an equivalent circuit of a liquid crystal display panel using an active matrix. A glass substrate provided with 200 to 300 rows of scanning electrodes $S_1, S_2, S_3 \ldots$ and another glass substrate similarly provided with columns of data electrodes $D_1, D_2, D_3 \ldots$ are disposed opposite each other with a spacing of 6 to 10 μm, to define a two dimensional array of cross points and a liquid crystal such as TN liquid crystal, or the like, is inserted therebetween. The scanning electrodes $S_1, S_2, S_3 \ldots$ are selected in sequence, and thus a liquid crystal element 21 of each unit pixel (picture element) is turned on and off according to signals applied to the data electrodes $D_1, D_2, D_3 \ldots$ to obtain an image. An diode pair of anti-parallel connection (diode ring comprising a pair of oppositely poled diodes connected in parallel) which is formed on the scanning electrode substrate is connected in series to the liquid crystal element 21, and a potential applied across opposite ends of the liquid crystal element is then retained for a time on the diode 22 even after another scanning electrode is selected, thus enhancing the contrast of the display. Such a matrix driving system is effective in enhancing picture quality particularly where the response speed is slow, for example, the 10 to 30 milliseconds characteristic of a liquid crystal element.

FIG. 3 is an enlarged view of a scanning electrode substrate including the diode pair 22 formed of amorphous silicon (a -Si). FIG. 3(a) is a plan view, and (b) is a sectional view taken on line B—B of (a). A SiO₂ thin film 2 is built up about 500 to 2,000 Å thick on a transparent substrate 1, such as glass or the like. The SiO₂ thin film is typically formed either by sputtering, electron beam evaporation, or heat drying a coating of an SiO₂ fine powder. The SiO₂ thin film is used to prevent sodium atoms, prevalent in the glass substrate, from coming into an indium-doped tin oxide (ITO) film which is to be formed thereon and making the display unit operate unstably.

Next, transparent electrode patterns 31, 32, 33 are formed through photolithography from a conductive film consisting of ITO typically of a thickness of several hundreds to 1,000 Å deposited by electron beam evaporation or sputtering. Each of the electrodes 31, 32 works as a pixel electrode and electrode 33 works as a scanning electrode, between which is to be formed the desired diode ring.

Then, to form the diodes of the ring deposited on the substrate there are formed thereon a Cr layer 41 between 500 to 2,000 Å thick, an a-Si layer 5 having a pin junction and a Cr layer 42 also between 500 to 2,000 Å thick. Typically the a-Si layer 5 is formed through a glow discharge decomposition process, having a p-layer of 100 to 500 Å thick, an i-layer of 0.3 to 1 μm thick and an n-layer of 100 to 500 Å thick. The layers may be arranged in the order either of pin or nip. The Cr layer 41, a-Si layer 5 and Cr layer 42 are patterned as shown through photolithography, using for example reactive ion etching. Next, a SiN film 6 is formed to a thickness of 500 to 2,000 Å by subjecting a SiH₄ and NH₃ gas mixture to glow discharge decomposition. Then this film is patterned through photolithography to the form illustrated. The Cr layer 42 acts as an etch mask to protect the amorphous silicon. Then, an Al layer 7 is provided to contact the Cr layer 42 at an opening of th SiN film 6. A scanning electrode substrate as shown in FIG. 3 is thus obtainable. Of course, the diode ring could have been mounted on the data electrode substrate, instead of the scanning electrode substrate.

With this structure, after allowing space to guard against short circuits and to provide room for the scanning electrode, the ratio of effective pixel area to the whole area (the aperture ratio) realizable typically is between 63–71 percent whereas with a simple matrix without the ring diode this ratio is between 81 and 86 percent. Accordingly, this approach produces a loss in picture sharpness although an improvement in contrast. Moreover, fabrication of such a display requires forming seven separate layers and uses four photolithographic sequences, each of which adds to the manufacturing cost.

The object of the present invention is a display which can be formed with fewer manufacturing steps to reduce costs and which has a better aperture ratio to improve the sharpness of the display.

SUMMARY OF THE INVENTION

To this end, in accordance with the invention, the substrate which is to include a diode ring connected between a metallic linear electrode (either the scanning or the data electrode) and a transparent pixel electrode is characterized in that the bottom of the semiconductor thin film of the first of the two diodes of the ring contacts the metallic linear electrode and the bottom of the semiconductor thin film of the second diode contacts a separate metallic wiring layer formed on the substrate, an extension of the pixel electrode contacts the upper electrode of the first diode at an opening of an insulating film , and a transparent wiring layer which is an extension of the linear electrode comes in contact with the upper electrode of the second diode at an opening of an insulating film coating of the second diode. diode. By use of such a substrate in which an extension of the pixel electrode serves as an interconnection, the number of layers needed can be reduced.

Additionally, in the preferred embodiment the pixel electrodes are formed over an insulating film coating both the diodes and the substrate whereby it is unnecessary to provide separation between the pixel electrode and the linear electrode whereby the ratio of the pixel area to the whole is increased. Moreover, since this insulating film isolates the substrate from the transparent conductive film of the pixel electrode, it becomes feasible to omit the silicon dioxide sodium barrier.

The invention will be better understood from the following more detailed description taken with the accompanying drawing.

BRIEF DESCRIPTION OF THE DRAWINGS

FIG. 1 represents on embodiment of the invention, wherein (a) is a plan view, and (b) is a sectional view taken on line A—A of (a);

FIG. 2, as already discussed, is an equivalent circuit diagram of an active matrix display;

FIG. 3, as already discussed, represents a conventional active matrix display, wherein (a) is a plan view, and (b) is a sectional view taken on line B—B of (a)

DETAILED DESCRIPTION OF THE INVENTION

Figure 4A:
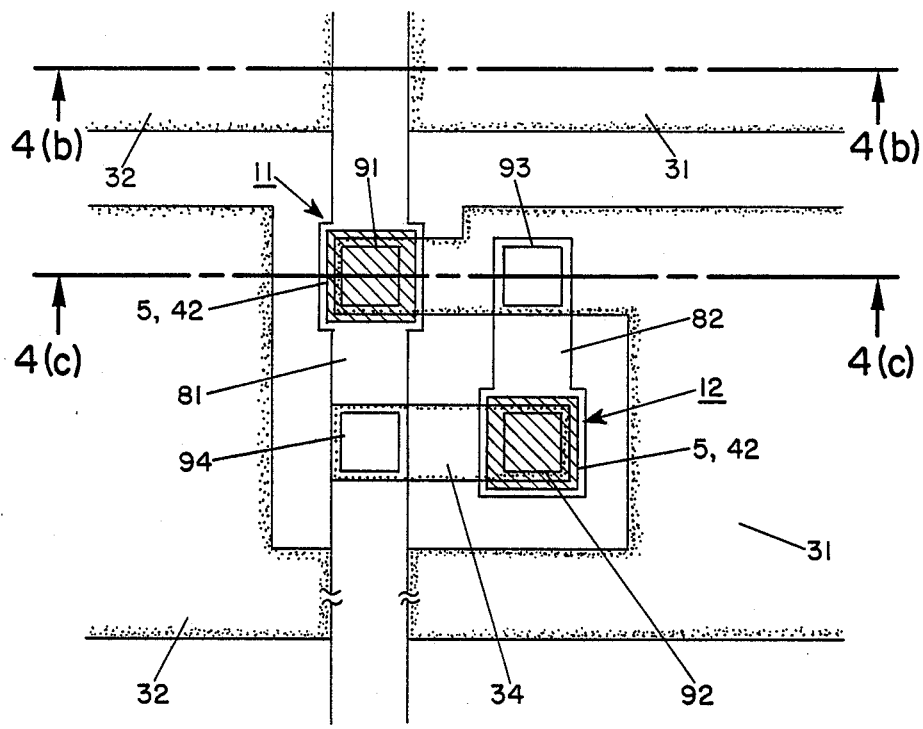
FIG. 4 represents another embodiment of the invention, wherein (a) is a plan view, (b) and (c) are sectional views taken on lines C—C and D—D of (a), respectively.

FIG. 1 represents one embodiment of the invention and in its parts common to those of FIG. 3 already described are identified by the same reference characters. The glass substrate 1 is coated with the $SiO_2$ thin film 2. Then, a metallic thin film such as Cr, Ti or the like is formed thereon to a thickness of 500 to 2,000 Å, and then is patterned through photolithography to form metallic layers 81, 82. The metallic layer 81 forms a portion of the scanning electrode and also serves as the lower electrode of diode 11, and the layer 82 serves as a wiring layer and as a lower electrode of diode 12 for the anti-parallel connection of diodes 11 and 12, forming the diode ring. The a-Si layer 5 has the structure already described, and the Cr upper electrode layer 42 is deposited over it. These layers are patterned to be smaller than the width of the scanning electrode 81. Next, the SiN film 6, formed as before, is patterned as illustrated. Then an ITO film is built up over the whole to a thickness of 1,000 to 3,000 Å and patterned to form regions 31, 32, 34 shown edged with dots. Regions 31, 32 serve as the pixel electrodes, and an extension of region 31 contacts the upper electrode 42 of diode 11 formed on the scanning electrode 81 and also overlaps an extension of the layer 82 which forms the lower electrode of diode 12. An extension of the transparent layer 34 contacts upper electrode of the diode 12, which was formed over wiring layer 82, and overlaps the scanning electrode portion of the layer 81. Therefore the two diodes 11, 12 are connected in anti-parallel to form the diode ring and inserted between the scanning electrode 81 and the pixel electrode 31. Since the transparent wiring electrode 34 is formed over the metallic scanning electrode 81, the scanning electrode is less apt to being disconnected, and the manufacturing yield is enhanced accordingly. In the above-described construction, six layers are formed on the glass plate 11, one layer less than in the prior art example. Further, the metallic layers 81, 82 of relatively large area are present on the incidence side of the diodes 11, 12, shading them from the light of the display and reducing the leakage of current in such diodes.

Figure 4B:
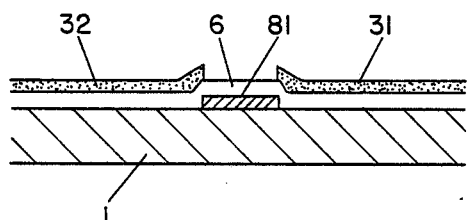
Figure 4C:
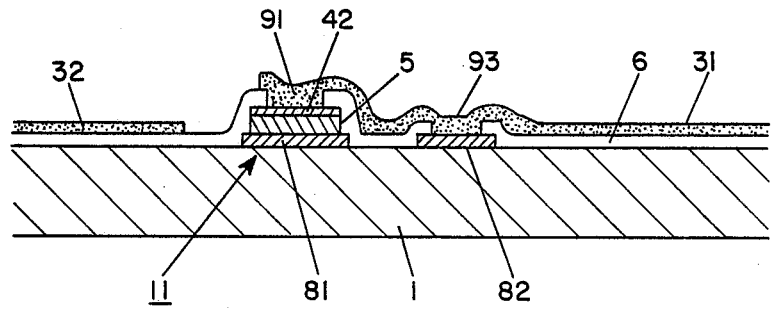

FIG. 4 represents a second embodiment of the invention, in which parts common to those of FIG. 1 are identified by the same reference characters. In this embodiment, the glass substrate can comprise a soda-glass substrate 1 free of the $SiO_2$ film used as the sodium barrier in the prior art example. First there is deposited a metallic layer, for example of chromium, and this is patterned to provide layers 81 and 82 of the kind used in FIG. 1. Next there are deposited in turn the triple a-Si layer 5 and the overlying chromium layer 42 and these are patterned to provide the diodes 11 and 12 as before. Next, the SiN film 6 is deposited over the whole, and then openings 91, 92 on the upper electrodes of the diodes 11, 12 and openings 93, 94 on the metallic layer 82 and the scanning electrode 81 are patterned. Next, the ITO film is deposited and patterned so as to obtain the regions 31, 32, 34, of which 31 and 32 serves as the pixel electrodes, and an extension of region 31 is used as before as wiring for connecting the upper electrode 42 of the a-Si diode 11 to the lower electrode 82 of the diode 12, while region 34 is used as the linear electrode with layer 81 and to connect to the upper electrode of diode 12. As shown in FIG. 4(b), the pixel electrodes 31, 32 are formed on the insulating film 6 adjacent to the scanning electrode 81.

Moreover, because pixel electrodes 31 and 32 are separated only by the width of the scanning electrodes 81 the effective area of each pixel electrode is reduced only by the area of the diode 12. Accordingly a much higher ratio of the total area, between 80 and 85 per cent, is available for display use.

Moreover, since either the insulating silicon nitride film 6 or a portion of metallic layer 81 or 82 is everywhere interposed between the ITO films 31, 32, 34 and the glass substrate, there is no need for the silicon dioxide sodium barrier used in the previously described displays. As a result only five layers are now needed on the glass substrate. Moreover, since the insulating silicon nitride film 6 can be thin, loss in transmission therethrough is small.

Accordingly, it can be appreciated that the invention makes possible a manufacturing process with fewer steps and so reduced cost and yet produces a display which should exhibit improved performance.

It is to be understood that the specific embodiments described are merely illustrative of the general principles of the invention and modifications thereof are possible without departing from the spirit and scope of the invention.

As has been previously implied, the diode pair may be connected either between the scanning electrode or the data electrode and the pixel electrode and accordingly, in the claims, the term linear electrode is intended to embrace either.

What is claimed:

1. An active matrix display which employs a pair of transparent insulated substrates between which is positioned an active display material for excitation and includes either scanning or data linear electrodes and pixel electrodes on each substrate and which further includes on one of the substrates a diode ring comprising a parallel pair of first and second oppositely poled diodes between each pixel electrode and each linear electrode characterized in that said one substrate includes a metallic linear electrode and a transparent pixel electrode between which are to be connected in parallel and oppositely poled the pair of thin film diodes; each diode having a first electrode and a second electrode a metallic wiring layer;

and a transparent conductive wiring layer, characterized in that a portion of the metallic linear electrode interposed between said one substrate and first diode serves as the first electrode of the first diode and a portion of the transparent conductive wiring layer electrically connects the metallic linear electrode and the second electrode of the second diode, and a portion of the pixel electrode electrically contacts the second electrode of the first diode, and the metallic wiring layer provides the first electrode of the second diode and electrically connects it to the pixel electrode.

2. The arrangement of claim 1 in which the pixel electrode is formed over an insulating film which overlies both diodes and the substrate.

3. The arrangement of claim 2 in which the linear electrode is formed between adjacent pixel electrodes which extend to the edges of the linear electrode and are isolated therefrom by the insulating film.

* * * * *